United States Patent Office 2,716,093
Patented Aug. 23, 1955

2,716,093

ACRYLONITRILE POLYMER SOLUTIONS AND PROCESS OF SHAPING THE SAME

William R. McClellan, Kennett Square, Pa., assignor to E. I. du Pont de Nemours and Company, Wilmington, Del., a corporation of Delaware No Drawing. Application June 12, 1951,
Serial No. 231,248

20 Claims. (Cl. 260—29.6)

This invention relates to solutions of polyacrylonitrile and more particularly to solutions which are of particular utility in the preparation of filamentary material.

The solubility of acrylonitrile polymers containing major amounts, i. e., 85% or more, of acrylonitrile in strong aqueous salt solutions such as solutions of thiocyanates is well known. See for example U. S. Patents 2,140,921, 2,404,714, 2,404,716, British Patent 636,476. Such solutions are of advantage in that they may be readily prepared from finely divided acrylonitrile polymer of average molecular weight, the solvent salts are generally cheap and available, and as has been shown in U. S. 2,404,714 and 2,404,716, fibers or films may be formed by extrusion of the solution into an aqueous coagulating bath. However, the products obtained are spongy, weak, undrawable and unsatisfactory for conventional film or filament applications. Furthermore, these highly concentrated solutions have certain further disadvantages in the fabrication of filamentary material. Thus, as shown in British Patent 636,476, the concentration of salt, such as zinc chloride, should be at least 60% and preferably 70–75%. Such a solution contains a very high concentration of salt and the concentration of polymer is generally low. Increasing the polymer concentration results in a viscous solution which is difficult to employ in spinning. Solutions in which the polymer concentration is low give coagulated fibers or films which are deficient in strength.

This invention has as an object the preparation of aqueous solutions of acrylonitrile polymers of viscosity suitable for spinning. A further object is the preparation of useful fibers and films from such solutions. Other objects will appear hereinafter.

These objects are accomplished by the invention of aqueous salt solutions containing from 8 to 25%, by weight thereof, of acrylonitrile polymers containing 32 to 50% of the salt, preferably an alkali metal thiocyanate or an alkaline earth metal thiocyanate, acrylonitrile polymer in amount from 25 to 100% of the weight of the salt, at least 5%, preferably at least 10%, but not more than 35% water, 15 to 35% of a neutral organic oxy compound containing not more than six carbons, liquid at room temperature, miscible with water in all proportions at room temperature, having a carbon to oxy oxygen ratio of from 1:1 to 3:1, and containing only carbon, hydrogen, and oxygen, said solution having a ratio of salt to acryonitrile polymer of from 1:1 to 4:1, which solutions have superior properties for the preparation of coagulated structures.

The solutions of this invention are readily obtained by mixing the salt, water, alcohol or ether and polymer. By the use of the selected oxygenated compounds, it is generally unnecessary that elevated temperatures be employed to effect solution of the compositions.

The following examples in which parts are by weight are illustrative of the invention.

*Example I*

A solution of 52.3 parts of sodium thiocyanate, 37.6 parts of calcium thiocyanate, 75.1 parts of water and 45 parts of dioxane is cooled to 0° C. and poured over 30 parts of a powdered copolymer of acrylonitrile and 2-methyl-5-vinylpyridine in the proportions of 95/5. The system is rapidly stirred immediately to get good wetting of the polymer before the system becomes viscous. On warming to room temperature a clear solution is obtained. This solution containing 12.5% polymer, 21.9% sodium thiocyanate, 15.6% calcium thiocyanate, 31.2% water and 18.8% dioxane is filtered, deaerated, and poured into the spinning bomb.

This solution at 25° C. is spun at a pump speed of 5.2 cc./min. through a 40-hole; 10 mil hole size, spinneret into water at 25–30° C. The filaments coagulate quickly and no trouble with stuck filaments is encountered. After a bath travel of 20 inches, the filaments are collected on a bobbin at a windup speed of 14 ft./min. Under these conditions there is almost no tension on the filaments (only enough to keep them taut in the coagulating bath) indicating that little, if any, stretching or orientation occurs in the coagulating bath. Water is dripped on the package of gel yarn during the windup operation to prevent the gel yarn from drying out. The yarn is soaked overnight in water and then dried in a relaxed state. The dried yarn is drawn to a ratio of 10/1 in water at 100° C. The yarn, in skein form, is then exposed to water at 100° C. for an hour (boil-off treatment). This boiled-off yarn has a tenacity of 1.8 g./d. at 17% elongation.

*Example II*

A solution of a copolymer of acrylonitrile and 2-vinylpyridine in the proportions of 95/5 is prepared by the same technique as described for the solution of Example I. Methanol is used in place of dioxane in this solution, and the final clear solution consists of 12.5% polymer, 21.8% sodium thiocyanate, 15.7% calcium thiocyanate, 31.2% water and 18.8% methanol.

The solution at 25° C. is spun at a pump speed of 2 cc./min. through a 30-hole (7 mil hole size) spinneret into a water coagulating bath at 25° C. A short bath travel of only three inches is used. The yarn passes under a free-rolling roller, located close to the spinneret, and out of the bath in a direction at right angles to the original direction of travel. The yarn is then passed around a glass rod, to give a snubbing action, and continues in a line parallel to the original direction of travel to a windup bobbin. Water is dripped on the windup bobbin to prevent the gel yarn from drying out during the windup operation. The gel yarn is exposed to water at 25° C. overnight to assure complete removal of salt. One package of yarn is collected under only slight tension at a windup speed of 3 ft./min. and another package is collected at a windup speed of 9 ft./min. This latter yarn is under considerable tension between the snubbing rod and the windup. These yarns are given a 2 Z (two turns per inch) twist while in the gel state and then are dried at 25° C. on a bobbin. It is particularly important to carry out the twisting operation on the gel yarn rather than the dried yarn if the yarn has been subjected to little or no stretching in the coagulating bath, as in the case of the former yarn. This type of yarn is somewhat brittle on drying out and accordingly some trouble is encountered with broken filaments if the twisting operation is carried out on the dried yarn; whereas, the gel yarn is not brittle and can be satisfactorily twisted. Yarn which has been stretched in the coagulating bath, as in the case of the latter yarn, is much tougher on drying out and may be twisted in the dried condition without any trouble.

The yarn collected at a windup speed of 3 ft./min. and dried on a bobbin is drawn to a ratio of 7.5/1 in steam at 100° C. The drawn yarn has a denier of 430 and a tenacity of 2.7 g./d. at 7% elongation. This yarn shrinks 18% in the boil-off treatment and then has a denier of 520 and a tenacity of 2.0 g./d. at 14% elongation.

The yarn collected at a windup speed of 9 ft./min. is drawn after drying to a ratio of 4.0/1 in steam at 100° C. The drawn yarn has a denier of 290 and a tenacity of 2.7 g./d. at 7% elongation. It shrinks 16% in the boil-off treatment and then has a denier of 345 and a tenacity of 1.8 g./d. at 13% elongation.

Example III

A solution containing 12.5% of the copolymer of Example I, 37.5% sodium thiocyanate, 31.2% water and 18.8% methanol is prepared as described for the solution of Example I. This solution at 25° C. is spun at a pump speed of 3.2 cc./min. through a 30-hole (5 mil hole size) spinneret into water at 8–10° C. The yarn is carried under a free-rolling roller and out of the bath to a glass snubber rod just as described in Example II. The yarn is taken from the glass snubber rod back into the coagulating bath for a travel of 20 inches and then out of the bath onto a Godet wheel traveling at a linear speed of 17 ft./min. The yarn is passed from the Godet wheel to a windup bobbin traveling at a linear speed of 25.5 ft./min. The free-rolling roller preceding the snubbing rod has a linear speed of 8.5 ft./min. and accordingly the yarn is stretched 2X in the coagulating bath between the snubbing rod and the Godet wheel. The gel yarn is stretched an additional 1.5X in air between the Godet wheel and the windup. The gel yarn is air-dried at 25° C. on the windup bobbin and a portion of this dried yarn is then drawn in steam at 100° C. to a ratio of 2.5/1. After a boil-off treatment in which a shrinkage of 18% occurs, the yarn has a denier of 250 and a tenacity of 2.0 g./d. at 15% elongation.

Another portion of the dried yarn is drawn in oil at 150° C. in place of drawing in steam at 100° C. This yarn is drawn to a ratio of 5.0/1. After a boil-off treatment in which a shrinkage of 12% occurred, the yarn has a tenacity of 3.5 g./d. at 15% elongation.

Example IV

A solution of 180 parts of sodium thiocyanate, 120 parts of water and 120 parts of methanol is cooled to −13° C. This solution is then poured over 60 parts of powdered polyacrylonitrile cooled to −13° C. in a flask. The flask is immediately stoppered and shaken vigorously for about one minute. In this operation good wetting of the powdered polymer is obtained before solution commences and the system becomes viscous. On warming to room temperature a clear solution is obtained which is filtered, deaerated, and poured into a spinning bomb.

This solution at 25° C. is spun at a pump speed of 4 cc./min. through a 30-hole (7 mil hole size) spinneret into water at 8–10° C. The path of the filaments between the spinneret face and the Godet wheel is the same as that described in Example III. The filaments are taken up on a Godet wheel with a linear speed of 17 ft./min. and are then passed through a water bath at 90° C. located between the Godet wheel and the windup bobbin. The yarn is collected on the windup bobbin at a linear speed of 35 ft./min. The yarn has a travel of seven inches in the hot water drawing bath. This yarn is given a 4 Z twist in the gel state and then dried at 25° C. on a bobbin. On drying the twist is set into the yarn. After a boil-off treatment in skein form, the yarn has a denier of 610 and a tenacity of 1.3 g. p. d. at 20% elongation.

Since the dried yarn is very twist lively, it is best to carry out the twisting operation of the gel yarn. However, the dried yarn may be twisted by sizing the yarn prior to twisting and setting the twist in the yarn by exposure of the yarn, wrapped on a bobbin, to water at 60° C.

Example V

A solution of 17.5 parts of sodium thiocyanate, 12.5 parts of calcium thiocyanate, 25 parts of water, and 15 parts of an ether or hydroxy compound as shown in the following table, was cooled to 0° C. and poured over 10 parts of a powdered copolymer of acrylonitrile and 2-methyl-5-vinylpyridine in proportion of 95/5. The system thus obtained was vigorously stirred and warmed to room temperature. A film was cast by the use of a casting blade having a 3 mil clearance. The film was coagulated immediately in water at 25° C. After washing for about 16 hours, the film was examined for toughness and ease of orientation and the strength of the drawn and dried product determined. The results obtained are summarized in the following table:

| No. | Ether or Hydroxy Compound | Character of Polymer Solution | Character (Toughness, Drawability, etc.) of Film Obtained |
|---|---|---|---|
| 1 | Methyl alcohol | Clear, homogeneous. | Excellent. |
| 2 | Ethyl alcohol | do | Do. |
| 3 | 2-Ethoxyethanol | do | Good. |
| 4 | Diethyleneglycol monoethyl ether. | do | Fair. |
| 5 | Ethylene glycol | do | Good. |
| 6 | Diethylene glycol | do | Fair. |
| 7 | Dioxane | do | Excellent. |
| 8 | Water | do | Opaque, cheesy. |
| 9 | Butyl alcohols | Cloudy, inhomogeneous. | |
| 10 | 1,2-Diethoxyethane | do | |
| 11 | Tetraethylene glycol | Cloudy | Opaque. |

In the above table, items numbered 8–11, which are outside the scope of this invention, indicate the necessity of the organic compound as herein defined.

Although any salt which, in concentrated aqueous solution, e. g. at its own weight of water, is a solvent for polyacrylonitrile (see, for example U. S. 2,140,921) can be employed to give solutions of acrylonitrile polymer, preferred and improved properties of polymer solutions are obtained by the use of thiocyanates of alkali forming metals, i. e., thiocyanates of the alkali metals and alkaline earth metals. For practical purposes, the most desired thiocyanates are those of lithium, sodium, potassium, magnesium, calcium and zinc, i. e., of elements of atomic number of 3 to 19 of group I and of 12 to 30 of group II in view of their availability and solvent properties. The cheapest and most available are the sodium and calcium thiocyanates.

The amount of thiocyanate in the polymer solution should be between 32 and 50%. When more than 50% is present the viscosity of the solution is too high for spinning by conventional spinning techniques at temperatures in the range of 20–30° C. Spinning at higher temperatures, e. g. at 65° C., to reduce solution viscosity, results in discoloration and degradation of the polyacrylonitrile. When less than 32% of the salt is present, a dispersion of the polymer, which is not amenable to spinning by conventional techniques, is obtained.

In the process of this invention there may be employed any acrylonitrile polymer containing at least 85%, by weight of the polymer, of acrylonitrile units including acrylonitrile homopolymer and copolymers of acrylonitrile with methacrylonitrile, vinyl chloride, vinyl acetate, aminonitrogen containing monomers, e. g. the vinylpyridines, quaternary ammonium monomers, e. g. vinyloxyethyltrimethylammonium chloride and other monomers disclosed in Barney Serial No. 216,838, filed March 21, 1951.

Any fiber forming polyacrylonitrile may be employed. The molecular weight of the polymer is generally not critical. Polymers having a medium molecular weight, e. g. 5,000 to 100,000, offer the best balance between solubility and physical properties of the resulting shaped and oriented product.

The polymer is preferably employed in the manufacture of the solutions in a finely divided form such as obtained by the polymerization of acrylonitrile in aqueous systems. Solution is effected faster when the particle size of the polymer is small.

The amount of polyacrylonitrile dissolved is 8 to 25% and generally of the order of 10 to 20%. It is critical that the ratio of salt to polymer be between 1:1 and 4:1, i. e., from 100 to 400% of the weight of the polymer. When the ratio is low, that is less than 1:1, the polymer solution is too viscous to be readily fabricated into films and fibers. When the ratio is more than 4:1, poorly formed and weak structures are obtained upon coagulation.

The organic oxy compound component is an ether or alcohol liquid at room temperature, i. e., 25° C., containing only oxygen, hydrogen, and not more than six carbons, having a ratio of carbon to oxy oxygen of 1:1 to 3:1, and miscible in water in all proportions at room temperature. Although unsaturated compounds, such as allyl and propargyl alcohols, may be employed, the preferred compounds are saturated, i. e., free from carbon to carbon unsaturation, and hydrocarbon except for the oxygen function. The invention is thus applicable to the use of monohydric alcohols, e. g. methyl, ethyl, propyl and furfuryl alcohols; glycols, e. g. ethylene glycol and hexamethylene glycol; higher polyhydric alcohols, e. g. glycerol and sorbitol; hydroxy ethers, e. g. diethyleneglycol and its monomethyl and mono-ethyl ethers and the monomethyl and monoethyl ethers of ethylene glycol; and ethers, e. g. dioxane. Superior results are obtained with alkanols of one to two carbons, i. g., methanol and ethanol. The oxy compound is employed in amounts of from 15 to 35% of the resulting solution. When more than 35% of the oxy compound is present in the solution, the product tends to be non-homogeneous. When less than 15% is present, polyacrylonitrile is not dissolved unless the salt concentration is markedly increased, for example, to amounts of the order of 60% of the solution.

The water is present in amount from 5 to 35% by weight of the solution but preferably from 10 to 35% by weight thereof.

The solutions of this invention have good viscosity for extrusion purposes, for example, viscosities of the order of 100 to 600 poises at 25° C. Extrusion, at temperatures of the order of 25 to 75° C., into water or water-containing small amounts, e. g. up to 10%, of a salt results in coagulation to give shaped objects, e. g. films and filaments.

The fibers obtained by this process may be modified with a variety of plasticizers and color forming materials. Orientation of the fiber by after drawing the dried fibers in hot water or hot air results in superior strength of the fiber.

In the specification and claims the terms "oxy" and "alkali forming metal" are used as in Patent Office Classification Bulletin No. 200.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An aqueous solution containing from 8 to 25%, by weight thereof, of an acrylonitrile polymer of at least 85% acrylonitrile content, said solution comprising from 32 to 50%, by weight of the solution, of a salt, a concentrated aqueous solution of which is a solvent for the acrylonitrile polymer, which polymer is dissolved in amount from 8 to 25% by weight of the solution and from 25 to 100% by weight of the salt, from 15 to 35%, by weight of the solution, of a neutral organic oxy compound liquid at 25° C. and miscible at 25° C. with water in all proportions, containing only oxygen, hydrogen, and not more than six carbons with from one to three carbons per oxygen, and from 5 to 35%, by weight of the solution, of water.

2. An aqueous solution containing from 8 to 25%, by weight thereof, of an acrylonitrile polymer of at least 85% acrylonitrile content, said solution comprising a water-soluble metal thiocyanate in amount from 32 to 50% by weight of the solution and from 100 to 400% by weight of the polymer, from 15 to 35%, by weight of the solution, of a saturated oxy compound liquid at 25° C. and miscible at 25° C. with water in all proportions, containing only oxy oxygen, hydrogen, and not more than six carbons with from one to three carbons per oxygen, and from 10 to 35%, by weight of the solution of water.

3. An aqueous solution according to claim 2 wherein the thiocyanate is a thiocyanate of an alkali forming metal.

4. An aqueous solution containing from 8 to 25%, by weight thereof, of an acrylonitrile polymer of at least 85% acrylonitrile content, said solution comprising a water-soluble metal thiocyanate in amount from 32 to 50% by weight of the solution and from 100 to 400% by weight of the polymer, from 15 to 35%, by weight of the solution, of an alkanol of not more than two carbons, and from 10 to 35%, by weight of the solution, of water.

5. An aqueous solution containing from 8 to 25%, by weight thereof, of an acrylonitrile polymer of at least 85% acrylonitrile content, said solution comprising a water-soluble alkali forming metal thiocyanate in amount from 32 to 50% by weight of the solution and from 100 to 400% by weight of the polymer, from 15 to 35%, by weight of the solution, of an alkanol of not more than two carbons, and from 10 to 35%, by weight of the solution, of water.

6. Process for the preparation of shaped objects which comprises extruding, in the desired shape, a solution according to claim 1 into a coagulating bath.

7. Process for the preparation of shaped objects which comprises extruding, in the desired shape, a solution according to claim 2 into a coagulating bath.

8. Process for the preparation of shaped objects which comprises extruding, in the desired shape, a solution according to claim 3 into a coagulating bath.

9. Process for the preparation of shaped objects which comprises extruding, into a coagulating bath and in the desired shape, an aqueous solution containing from 8 to 25%, by weight thereof, of an acrylonitrile polymer of at least 85% acrylonitrile content, said solution comprising a water-soluble metal thiocyanate in amount from 32 to 50% by weight of the solution and from 100 to 400% by weight of the polymer, from 15 to 35%, by weight of the solution, of an alkanol of not more than two carbons, and from 10 to 35%, by weight of the solution, of water.

10. Process for the preparation of shaped objects which comprises extruding, into a coagulating bath and in the desired shape, an aqueous solution containing from 8 to 25%, by weight thereof, of an acrylonitrile polymer of at least 85% acrylonitrile content, said solution comprising a water-soluble alkali forming metal thiocyanate in amount from 32 to 50% by weight of the solution and from 100 to 400% by weight of the polymer, from 15 to 35%, by weight of the solution, of an alkanol of not more than two carbons, and from 10 to 35%, by weight of the solution, of water.

11. In the formation of shaped objects from acrylonitrile polymers by coagulation of aqueous salt solutions of acrylonitrile polymers, the improvement wherein the aqueous solution contains from 5 to 35%, by weight of the solution, of water, contains the polymer in amount from 8 to 25%, by weight of the solution, contains the salt in amount from 32 to 50% by weight of the solution and from 100 to 400% by weight of the polymer, and also contains from 15 to 35%, by weight of the solution, of a neutral oxy compound liquid at 25° C. and miscible at 25° C. with water in all proportions, containing only oxygen, hydrogen, and not more than six carbons, with from one to three carbons per oxygen.

12. In the formation of shaped objects from acrylonitrile polymers by coagulation of aqueous salt solutions of acrylonitrile polymers, the improvement wherein the the aqueous solution contains from 10 to 35%, by weight of the solution, of water, contains the polymer in amount from 8 to 25%, by weight of the solution, contains the salt in amount from 32 to 50% by weight of the solution and from 100 to 400% by weight of the polymer, and also contains from 15 to 35%, by weight of the solution, of a neutral oxy compound liquid at 25° C. and miscible at 25° C. with water in all proportions, containing only oxy oxygen, hydrogen, and not more than six carbons, with from one to three carbons per oxygen.

13. In the formation of shaped objects from acrylonitrile polymers by coagulation of aqueous salt solutions of acrylonitrile polymers, the improvement wherein the aqueous solution contains from 8 to 25%, by weight thereof, of an acrylonitrile polymer, contains from 10 to 35%, by weight of the solution, of water, contains the salt in amount from 32 to 50% by weight of the solution and from 100 to 400% by weight of the polymer, and also contains from 15 to 35%, by weight of the solution, of a saturated oxy compound liquid at 25° C. and miscible at 25° C. with water in all proportions, containing only carbon, hydrogen, and oxy oxygen with from one to three carbons per oxygen and not more than six carbons.

14. In the formation of shaped objects from acrylonitrile polymers by coagulation of aqueous salt solutions of acrylonitrile polymers, the improvement wherein the aqueous solution contains from 8 to 25%, by weight thereof, of an acrylonitrile polymer, contains from 10 to 35% water by weight of the solution, contains sodium thiocyanate in amount from 32 to 50% by weight of the solution and from 100 to 400% by weight of the polymer, and also contains from 15 to 35% by weight of the solution, of methanol.

15. An aqueous solution containing from 8 to 25%, by weight thereof, of an acrylonitrile polymer of at least 85% acrylonitrile content, containing sodium thiocyanate in amount from 32 to 50% by weight of the solution and from 100 to 400% by weight of the polymer, containing from 10 to 35%, by weight of the solution, of water and containing from 15 to 35%, by weight of the solution, of methanol.

16. Process for the preparation of shaped objects which comprises extruding a solution according to claim 1 in the desired shape into a coagulating bath.

17. Process for the preparation of shaped objects which comprises extruding a solution according to claim 2 in the desired shape into a coagulating bath.

18. Process for the preparation of shaped objects which comprises extruding a solution according to claim 3 in the desired shape into a coagulating bath.

19. The method of producing shaped objects from an acrylonitrile polymer of at least 85% acrylonitrile content, said method comprising (1) shaping a solution, according to claim 1, and (2) contacting the shaped mass with a coagulating bath.

20. The method of producing a synthetic fiber from an acrylonitrile polymer of at least 85% acrylonitrile content which comprises extruding the said polymer in the form of a fiber from a solution of said polymer according to claim 1 and, immediately after extrusion, contacting the extruded mass with a liquid coagulating bath.

References Cited in the file of this patent

UNITED STATES PATENTS 2,425,192 Kropa _____ Aug. 5, 1947